United States Patent
Pimenov et al.

(10) Patent No.: US 6,514,413 B2
(45) Date of Patent: Feb. 4, 2003

(54) METHOD OF DRINKING WATER DISINFECTION

(75) Inventors: Alexander V. Pimenov, St. Petersburg (RU); Alexander G. Mitilineos, St. Petersburg (RU); Joseph L. Shmidt, New York, NY (US)

(73) Assignee: Electrophor, Inc., Dobbs Ferry, NY (US)

( * ) Notice: Subject to any disclaimer, the term of this patent is extended or adjusted under 35 U.S.C. 154(b) by 0 days.

(21) Appl. No.: 09/837,529

(22) Filed: Apr. 18, 2001

(65) Prior Publication Data

US 2002/0056687 A1 May 16, 2002

(30) Foreign Application Priority Data

Apr. 19, 2000 (RU) .......................................... 2000110095

(51) Int. Cl.$^7$ .................................................. C02F 1/50
(52) U.S. Cl. ...................... 210/668; 210/764; 210/501; 210/502.1; 210/505
(58) Field of Search ................................ 210/668, 764, 210/501, 502.1, 503, 505, 679, 685, 694, 686, 753; 422/37

(56) References Cited

U.S. PATENT DOCUMENTS

| | | | | | |
|---|---|---|---|---|---|
| 2,434,190 | A | * | 1/1948 | Barnes | 210/764 |
| 2,692,855 | A | * | 10/1954 | Juda | 210/668 |
| 3,462,363 | A | * | 8/1969 | Mills | 210/764 |
| 3,817,860 | A | * | 6/1974 | Lambert et al. | 210/501 |
| 4,076,622 | A | * | 2/1978 | Costin | 210/501 |
| 4,190,529 | A | * | 2/1980 | Hatch | 210/668 |
| 4,555,347 | A | * | 11/1985 | O'Dowd et al. | 210/764 |
| 4,769,143 | A | * | 9/1988 | Deutsch et al. | 210/266 |
| 5,314,968 | A | * | 5/1994 | Frommer et al. | 525/356 |
| 5,366,636 | A | * | 11/1994 | Marchin et al. | 210/764 |
| 5,521,008 | A | * | 5/1996 | Lieberman et al. | 428/367 |

* cited by examiner

Primary Examiner—Ivars Cintins
(74) Attorney, Agent, or Firm—Ronald S. Cornell

(57) ABSTRACT

A method for disinfecting and purifying tap water and untreated water using a composite, bactericidal adsorption material as a filter. The method provides efficient and reliable disinfection, with simultaneous purification of water from heavy metal ions and organic matter and improvement of taste and odor. Water is filtered through a composite material containing granules of iodinated anion-exchange resin, granulated activated carbon and silver containing adsorbent, all uniformly distributed between amphoteric fibers. The exterior surface area of the iodine containing anion-exchange resin granules is not more than 1% of the exterior surface area of the amphoteric fibers, and the equivalent content of silver exceeds the equivalent content of iodine.

18 Claims, 1 Drawing Sheet

METHOD OF DRINKING WATER DISINFECTION

FIELD OF THE INVENTION

This invention relates to a water disinfection method wherein composite bactericidal adsorption materials are used for the treatment of drinking water from the tap and other fresh water sources.

BACKGROUND OF THE INVENTION

During the last two decades, various adsorbents have been used to disinfect water. The most common of them are activated carbon materials and ion exchange resins with bactericidal compounds, such as iodine, bromine and silver. The strong bactericidal properties of iodine and silver make them ideal disinfectants for small scale water supply systems.

It is known in the prior art of drinking water disinfection to use powdered activated carbon with particle sizes from 0.1 to 2000 µm, as a carrier for silver in metallic form or as a nitrate salt (West German Patent Application No. 3229340, published 1984, B01I20/20), or to use activated carbon impregnated with silver salt (USSR Patent No. 971 464, published 1982, B01I20/20).

For the simultaneous disinfecting and purification of drinking water it is known to use a composition of coarse and fine carbon fibers, including carbon fibers activated with metal salts; for instance, silver in an amount of 0.01 to 8% deposited thereon as a bactericidal additive (Switzerland, Patent No. 556,680, published 1974, B01D39/00).

The disinfection of drinking water by passing it through the above described activated materials which were treated with silver salts was not sufficiently efficient due to the fact that the improvement in the bactericidal properties was effected by silver ions released into water in the course of the treatment. To ensure longevity of the bactericidal properties, it is necessary to treat said materials with concentrated silver salt solutions, which may adversely affect human health if imbibed.

U.S. Pat. No. 4,555,347 teaches the use of filtration material in the form of activated carbon and iodine crystals for water disinfection. However, the method, which is based on releasing iodine into water, can not be used for continuous consumption.

In order to eliminate bacteria in drinking water, it is known to use anion-exchange resin treated with silver nitrate solution (U.S. Pat. No. 2,434,190), and to use a cation exchange resin treated with a silver salt solution (U.S. Pat. No. 2,692,855).

In the case of long term use of bactericide containing ion-exchange resins, water also accumulates large amounts of silver ions. It happens in the same manner as with activated materials. In addition, in the course of disinfection, the resin becomes contaminated and loses its ion-exchange properties.

U.S. Pat. No. 3,817,860 discloses a water disinfection method where water is brought into contact with layers of an iodine containing resin and treatment by silver salts. U.S. Pat. No. 5,366,636 and the Journal of Water Chemistry and Technology, USSR, 1989, vol. 11, No. 2 disclose methods wherein the water passes through layers of iodine and silver containing ion-exchange resins. In the abovementioned cases, iodine is released into the water in the course of the drinking water disinfection, and then iodine is removed due to binding into the insoluble AgI compound.

According to the U.S. Pat. No. 5,366,636, water was passed through a porous, granular, iodine containing anion-exchange resin. As water actively contacted the resin, the iodine was released into the water. Then the treated water was passed through the porous granules of a chelating Ag-Chelex resin, which contains iminodiacetate groups and bound silver ions. The silver ions react with the iodide ions forming insoluble silver iodide. This method has a disadvantage, because to be effective large amounts of iodine must be released into the water from the anion-exchange resin. Then it is necessary to trap this iodine in the subsequent layers of adsorbents. In the likely event that there are channeling effects in the subsequent layers of adsorbents, or, if the adsorbent becomes saturated by other contaminants, iodine will leak into the purified water.

The process of water disinfection by passing it successively through layers of iodine containing anion exchange resin, synthetic activated carbon and macroporous strong acid cation exchange resin treated with silver nitrate solution allows to efficiently disinfect water of microorganisms (E. Coli). However, it implies the use of high concentrations of bactericidal components. As a result, molecular $I_2$ and Ag+ ions remain in the water and have to be purged out in the course of subsequent treatment (Journal of Water Chemistry and Technology, USSR, 1989, vol. 11, No. 2).

There is also known in the prior art a method of water disinfection using filtering material composed of an ion-exchange resin mixture. The essence of the method is in passing water through the mixture of ion-exchange resins (99%) and bacteriostatic resin (1%). The bacteriostatic properties of the resin are related to the metallic silver grains present on the surface and inside the granules of the resin. The mixture of resins prevents biomass development in the ion-exchange filter and the infiltration of bacteria into the water ("Eau et Ind.", 1981, No. 58, 88 –90). However, despite the mentioned merits of the method, the silver ions are still washed out of resin in the course of time, getting into the water and, being accumulated in it, adversely affect human health.

Although much attention has been given to the issues of drinking water disinfection, and while iodine and silver have been used in the prior art, it was not known how to avoid, with the course of time, leakage of the iodine and/or the silver into the filtered water. For instance, if water contains an increased concentration of dissolved salts (high hardness), silver is quickly washed out due to the ion exchange mechanism. Problems arise during disinfection of drinking water with iodine, because it is necessary to enrich the water with a large quantity of iodine (at least 1 mg/l). The iodine has to remain in contact with the water for a long time, followed by the subsequent removal of iodine from the outflowing water. At iodine concentrations in water exceeding 4 mg/l, water acquires a distinct iodine odor. Long term consumption of iodinated water affects the thyroid gland. Secondly, when water passes through bactericide layers of resins, with time there is an accumulation of bacteria and biomass in the layer that does not contain bactericides, and bacteria subsequently infects the drinking water.

SUMMARY OF THE INVENTION

An object of this invention is the development of a new drinking water disinfection method which ensures disinfection reliability and efficiency with the preservation over time of the degree of water purification in removing heavy metal ions, organic matter and the improvement of taste and odor.

The present invention solves the problems of the prior art, and comprises filtration of drinking water through a composite material containing uniformly distributed granules of iodine containing anion exchange resin, granulated activated carbon, amphoteric fibers, and silver containing adsorbent; which will generally be a granular cation exchange resin such as C249 from Sybron, USA with $Ag^+$ ions thereon. Silver containing adsorbent in granular form is preferred over the fibrous form, because it has been found that granules release silver more easily by ion-exchange mechanism.

An important aspect of our invention is to maintain the exterior surface area of the iodine containing anion-exchange resin granules at not more than 1% of the exterior surface area of the amphoteric fibers, and is preferably kept at less than 0.2% of the exterior surface thereof. In addition, in accordance with this invention, the total equivalent content of silver in the said composite material must exceed the equivalent content of iodine therein. While almost any excess of silver over iodine can be used (e.g., as little as 0.1%), desirably the excess equivalent content of silver will be more than about 10 percent. Preferably, the excess equivalent content of silver will be from about 15 to 30 percent greater than the equivalent content of iodine. It is within the scope of the invention to use as much as 50% excess or more. A higher excess of silver can be used where the water to be treated contains chlorides or other ions which are capable of reacting with the $Ag^+$ ions to form substantially insoluble compounds. Upon contact with water containing halides, a layer of practically insoluble silver halogen compounds will be formed on the surface of the iodinated anion-exchange resin.

In a first embodiment of the invention, the composite material of the invention is comprised of:

| | |
|---|---|
| granular activated carbon | 50 to 90%, |
| amphoteric fibers | 1 to 50%, |
| silver containing adsorbent | 0.1 to 1%, and |
| iodinated anion exchange resin | 0.1 to 1%. |

In another embodiment of the invention, the composite material is comprised of:

| | |
|---|---|
| granulated activated carbon | 5 to 50%, |
| amphoteric fibers | 1 to 20%, |
| silver containing adsorbent | 0.1 to 1%, |
| iodinated anion exchange resin | 0.1 to 1%, |
| cation exchange resin | 5 to 50%, and |
| anion exchange resin | 5 to 50%. |

The amphoteric fibers in the first and second embodiments of the composite material of the present invention comprise activated carbon fibers, ion-exchange polymer fibers and mixtures thereof. Useful activated carbon fibers will have an adsorption capacity of methylene blue of at least 360 mg/g, lengths of 0.2 to 10 mm, and diameters of 1 to 20 microns (preferably diameters of 5 to 10 micron). Suitable activated carbon fibers can be produced using procedures such as those described in U.S. Pat. No. 5,521,008.

A preferred ion-exchange polymer fiber is modified polyacrylonitrile, which can be manufactured using conventional techniques involving alkaline hydrolysis of polyacrylonitrile in the presence of cross-linking agents. Suitably, the ion-exchange polymer fibers will have an ion-exchange capacity of basic groups of at least 1 meq/g, and of acidic groups of at least 2 meq/g, lengths of 0.1 to 10 mm, and diameters of 1 to 50 microns (preferably 10 to 20 microns).

The silver containing adsorbent will advantageously comprise silver containing cation exchange resin or silver containing modified polyacrylonitrile based fibers. The modified polyacrylonitrile based fibers can be obtained in a known manner using alkaline hydrolysis of polyacrylonitrile in the presence of binding agents. They have ion-exchange capacity for basic groups of at least 1 meq/g (milliequivalents per gram), and ion-exchange capacity for acidic groups of at least 2 meq/g, lengths of 1 to 10 mm, and diameters of 1 to 50 microns, preferably 5 to 10 microns.

As water is filtered through the composite material, a layer of practically insoluble silver halogenide compounds is formed on the surface of the granules of iodine containing anion-exchange resin. Release of iodine into water is blocked due to that formation. Complete binding of iodine in the form of practically insoluble silver iodide is guaranteed, because the equivalent content of silver in the material exceeds the equivalent content of iodine.

Excessive silver, as well as excessive iodine is undesirable. Iodine removal is described in many publications; e.g., by passing water through an activated carbon layer. This invention describes using a relatively small amount of silver as compared to prior art methods. Leakage of large amounts of silver into filtered water is thereby avoided. Moreover, any excessive amount of silver (as compared to iodine) interacts with the chloride ions usually present in drinking water, causing formation of silver chloride sediment which becomes attached to the surface of the adsorbents.

The equilibrium content of bactericidal components in solution may be calculated based on the solubilities of the corresponding silver salts. The solubility multipliers (SM) of the silver chloride and silver iodide compounds are, respectively, $1.73 \cdot 10^{-10}$ and $8.1 \cdot 10^{-17}$ $(mol/l)^2$. If, for example, the chloride ion concentration in water is 50 mg/l ($1.4 \cdot 10^{-3}$ mol/l), then the equilibrium concentration of silver ions in solution is:

$$[Ag^+]=SM_{AgCl}/[Cl^-]=1.2 \cdot 10^{-7} \text{ mol/l}=0.013 \text{ mg/l},$$

and the equilibrium iodide concentration is $$[I^-]=SM_{AgI}/[Ag^+]=7 \cdot 10^{-10} \text{ mol/l}=8 \cdot 10^{-8} \text{ mg/l}.$$

Thus, equilibrium concentrations of iodide and silver in solution contacting the composite adsorption material are considerably less than the maximum permissible concentrations (World Health Organization "Water Quality Control Manual"; "European Community Drinking Water Directive" 80/778/EC).

It is believed that the bactericidal effect according to the invention is achieved because the barely soluble bactericidal compounds of silver spread on the developed surface of the material. The granules (the sources of bactericidal substances) are located inside a mesh formed by the amphoteric fibers. The ratio of the size of the granules (1 mm diameter) to the size of the fibers (5–20 micron in diameter) is large. This provides efficient contact between the surface of granules, containing barely soluble silver compounds, and the fibers. Cations of silver and anions of iodide, which are present near the sediment, are adsorbed by the cation and anion exchange groups of the amphoteric fibers, whereupon salt sediment may be formed again. Thus, the sediments of the barely soluble bactericidal compounds, which are initially formed on the surface of the granules (the "source granules"), migrate and gradually spread on the surface of the amphoteric fibers. In accordance with the invention, the surface area of the amphoteric fibers exceeds the exterior surface area of the source granules by at least 100 times, desirably 500 times, and most preferably 800 to 900 times.

In the process of filtration of contaminated water, the microorganisms are adsorbed on the developed surface of the material that contains insoluble bactericidal compounds. The microorganisms contact the bactericides directly, and as the bactericides penetrate through the cellular membrane the microorganisms die. There is no concomitant release of bactericides into the filtered water.

Based on the above description, it is seen that water filtration by the claimed method provides increased time of bacteria contact with the bactericide, thus considerably increasing the life of the sorption column.

DETAILED DESCRIPTION OF THE INVENTION

Figure 1:
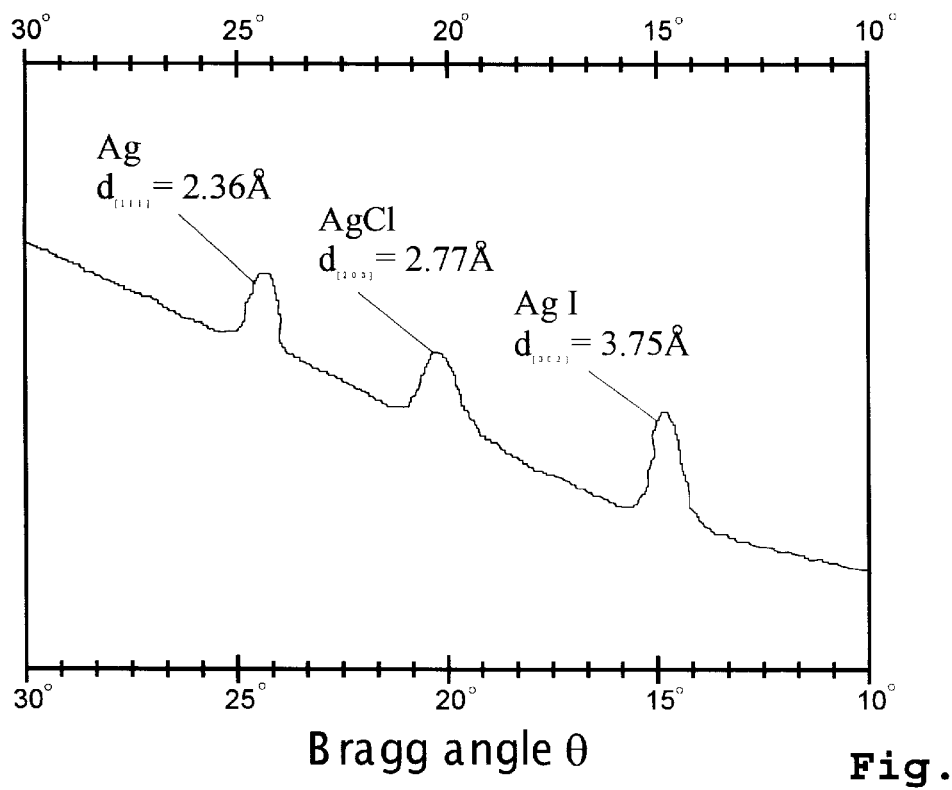
FIG. 1 is an x-ray phase diagram that graphically illustrates the presence of barely soluble silver halogenide compounds.

Referring now to FIG. 1, it will be seen that the presence of the barely soluble compounds of silver halogenides is confirmed by the corresponding peaks in the X-ray phase diagrams of the adsorption mixture (Lipson G., Steeple G., Interpretation of powdered X-ray grams. X-ray diffraction data cards, ASTM).

The exterior surface of the iodine containing anion-exchange resin granules is calculated using the formula below:

$$S_I = x_I s_g = x_I (4\pi r^2)/(4/3\pi r^3 \cdot d) = 3x - /(rd),$$

where:
- $S_I$ = the exterior surface area of the iodine containing resin granules per unit weight of the material;
- $x_I$ = proportional mass of the iodine containing resin in the material;
- $s_g$ = specific area of the surface of a singular granule;
- $r$ = radius of the iodine containing resin granules; and
- $d$ = density of the iodine containing resin.

The exterior surface area of the amphoteric fibers is calculated using the formula below:

$$S_f = x_f s_g = x_f(2\pi rl)/(\pi r^2 l d) = 2x_f/(rd),$$

where:
- $S_f$ = the exterior surface of amphoteric fibers calculated per unit weight of the material;
- $x_f$ = proportional mass of the amphoteric fibers in the material;
- $s_g$ = specific area of the surface of a single fiber;
- $r$ = the radius of the fiber;
- $l$ = length of a single fiber; and
- $d$ = density of fibers.

If the exterior surface area of the iodine containing anion-exchange resin granules is more than 1% of the exterior surface area of the amphoteric fibers in the composite material, then the water will be filtered through material of unjustifiably high iodine concentration. In addition, the silver iodide sediment would be washed out of the filter into the water, which shortens the life of the adsorption column and deteriorates water quality.

When the silver content is equal to or less than the equivalent iodine content in the material, soluble iodine compounds may be partially washed out of the filtering material, whereby the taste and odor of the water are deteriorated.

Figure 2:
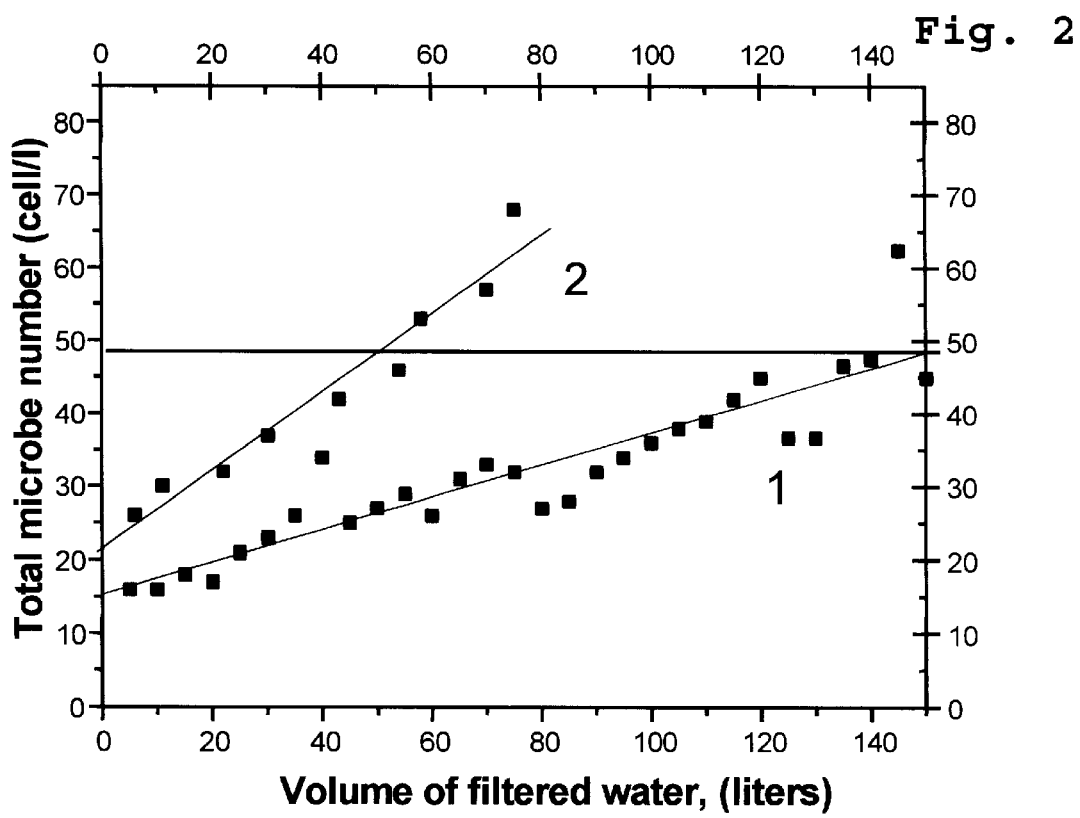
FIG. 2 depicts the capacity of an adsorption column made in accordance with the invention in comparison with a column using layered materials.

FIG. 2 compares capacities of the adsorption columns <1> and <2>. The adsorption column <1> is filled with substantially homogeneously admixed bactericidal material made in accordance with Example 6 of the invention. The adsorption column <2> is filled with layers of iodine containing anion exchange and silver containing cation exchange resins using the same amounts as <1>. Water contaminated with E. Coli (total microbe number TMN of 1000 cell/ml) is filtered through both columns. The increased capacity of column <1> (made in accordance with the present invention) is confirmed.

Use of the present invention results in an increase the duration of the bactericidal action during water purification over time and ensures high reliability of water disinfection.

The materials used in the following examples of drinking water disinfection are, for the most part, well known. Granular activated carbon (GAC) is widely known in water preparation, and useful GAC is in the form of porous carbon particles 50 to 3000 microns in size. Strong acid cation exchange resin and weak acid carboxylic cation exchange resin in both gel and macroporous form are used as cation exchange resins. Strong base anion exchange resins are used as anion-exchange resins. Modified polyacrylonitrile based fibers obtained by alkaline hydrolysis of polyacrylonitrile in the presence of cross-linking agents are used as amphoteric fibers. It is preferable to use fibers 1 to 10 mm long, 1 to 50 microns in diameter, with an ion-exchange capacity of basic groups of at least 1 meq/g, and of the acidic groups of at least 2 meq./g. Activated carbon fibers (ACF) may also be used as amphoteric fibers. Useful viscose type activated carbon fibers are produced by Aquaphor Corp., St. Petersburg, Russia. They have, preferably, fiber lengths of 1 to 10 mm, diameters of 1 to 50 microns and they have an adsorption capacity for methylene blue of at least 350 mg/g. Strong base anion exchange resin (A554 Sybron Corp., USA) containing adsorbed molecular iodine is advantageously used as the iodine carrier. Cation exchange resins (C-240 NS Sybron Corp., USA) in Ag-form are used as the carrier of the silver ions.

The composite material, which is used for the drinking water disinfection method of this invention, may be manufactured as follows. Amphoteric fibers (said activated carbon fibers or said modified polyacrylonitrile based fibers) are loaded in the prescribed amount into a mixing unit filled with water and are mixed intensively. The amounts of components are measured by weight, and the prescribed amounts of the granular activated carbon, the iodine containing anion-exchange resins and the silver containing adsorbent are simultaneously added into the vessel. In an alternative embodiment of the invention, granular cation exchange and anion-exchange resins (the second embodiment) are also simultaneously added into the vessel. The agitation is continued until the granules are substantially uniformly distributed between the fibers. Then the surplus water is removed by draining it into a vessel. Water removal continues until the residual humidity of 30 to 35% by weight is attained. The composite material is then packed into an adsorption column. In operation, water, contaminated with

*E. Coli*, heavy metals and organic matter, is filtered through the column at 0.1 l/min flow rate and 0.001 to 5 atm. pressure.

The nature of the invention and its advantages are explained by the following examples. In these examples, as well as throughout the specification and claims, and unless otherwise noted, all parts and percents are expressed as parts and percents by weight, and also unless otherwise noted the amount of impure water treated in each of the examples is 1 liter.

EXAMPLE 1

A composite material is obtained in accordance with the above described method by initially admixing components in the following amounts until the admixture is substantially homogeneous:

50 parts granular activated carbon[1], 0.5 part silver containing cation exchange resin granules[2], which contain 250 mg silver/g of resin, 0.5 part iodine containing anion exchange resin granules[3], which contain 250 mg iodine/g of resin, and 49 parts activated carbon fibers[4].

[1] Coconut shell activated carbon supplied by Barnebye & Sutcliffe, (USA) (SE 20×50 mesh)
[2] C249NS, Sybron Corp, USA. Granular size from 0.3 mm to 2 mm in diameter. The C249NS resin was immersed in silver nitrate solution to effect adsorption of the specified amount of silver.
[3] A554 Sybron Corp., USA
[4] Viscose type activated carbon fibers, 6 to 10 microns in diameter, produced by Aquaphor Corp., St. Petersburg, Russia The equivalent ratio of the amounts of silver and iodine in the mixture, using the corresponding atomic weights of the elements, is calculated as follows:

$$Ag:I=(250/107):(250/127)=2.34:1.97$$

The exterior surface area of the iodine containing anion-exchange resin granules is calculated as follows:

$$S_f=(3\cdot 0.005)/(0.001\cdot 1500)=0.01 \text{ m}^2 \text{ per 1 kg of material.}$$

The exterior surface area of the activated carbon fibers (amphoteric fibers) is calculated as follows:

$$S_f=(2\cdot 0.49)/(1\cdot 10^{-5}\cdot 1100)=8.9 \text{ m}^2 \text{ per 1 kg of material.}$$

The ratio of the exterior surface area of the iodine containing anion-exchange resin granules to the exterior surface area of the activated carbon fibers (amphoteric fibers) is 890:1.

This composite material is packed into a cylindrical column 30 mm in diameter and 60 mm high. Water containing 100 cells/l Coli-index (*E. Coli* content) and 200 cells/ml total microbe number (TMN) is passed through the column at a flow rate of 0.1 l/min and at a pressure of 0.005 atm. No *E. Coli* cells are found in the filtered water (Coli-index 0), TMN is 8 cells/ml.

EXAMPLE 2

A composite material is obtained by the above described method by initially admixing components in the following amounts until the admixture is substantially homogeneous:

49.5 parts granulated activated carbon, 1 part polyacrylonitrile based silver containing modified fibers obtained by alkaline hydrolysis in the presence of cross-linking agents with a silver content of 107 mg/g, 0.5 part iodine containing anion-exchange resin with an iodine content of 200 mg/g, and 49 parts activated carbon fibers.

The equivalent ratio of the amounts of silver and iodine in the mixture, using the corresponding atomic weights of the elements, is calculated as follows.

$$Ag:I=(1\cdot 107/107):(0.5\cdot 200/127)=1:0,79.$$

The exterior surface area of the iodine containing anion-exchange resin granules is calculated as follows:

$$S_f=(3\cdot 0.005)/(0.001\cdot 1500)=0.01 \text{ m}^2 \text{ per 1 kg of material.}$$

The exterior surface area of the activated carbon fibers (amphoteric fibers) is calculated as follows:

$$S_f=(2\cdot 0.49)/(1\cdot 10^{-5}\cdot 1100)=8.9 \text{ m}^2 \text{ per 1 kg of material.}$$

This substantially homogeneously admixed composite material is packed into a cylindrical column 30 mm in diameter and 60 mm high. Water containing 100 cells/l Coli-index (*E. Coli* content) and 200 cells/ml total microbe number (TMN) is passed through the column at a flow rate of 0.1 l/min and at a pressure of 0.005 atm. No *E. Coli* cells are found in the filtered water (Coli-index 0), TMN is 8 cell/ml.

EXAMPLE 3

A substantially homogeneous composite material is obtained by the above described method by admixing the initial components in the following amounts:

35 parts granular activated carbon, 19.5 parts cation-exchange resin[5], 0.5 part silver containing cation-exchange resin with 250 mg/g silver content, 24.5 parts anion-exchange resins[6], 0.5 part iodine containing anion-exchange resin with 250 mg/g iodine content, and 20 parts activated carbon fibers[7].

[5] C249NS Sybron Corp., USA
[6] A554 Sybron Corp., USA
[7] Viscose type activated carbon fibers supplied by Aquaphor (6 to 10 microns in diameter)

The silver to iodine ratio is analogous to Example 1. The exterior surface of the iodine containing anion exchange granules is calculated as follows:

$$S_f=(3\cdot 0,005)/(0.001\cdot 1500)=0.01 \text{ m}^2 \text{ per 1 kg of material.}$$

The exterior surface of the activated carbon fibers (amphoteric fibers) is calculated as:

$$S_f=(2\cdot 0.20)/(1\cdot 10^{-5}\cdot 1100)=3.6 \text{ m}^2 \text{ per 1 kg of material.}$$

This composite material is packed into a cylindrical column 30 mm in diameter and 60 mm high. Water containing 100 cells/l Coli-index (*E. Coli* content) and 200 cells/ml total microbe number (TMN) is passed through the column at the flow rate of 0.1 l/ min and at the pressure 0,005 atm. No *E. Coli* cells are found in the filtered water (Coli-index 0), TMN is 10 cell/ml.

EXAMPLE 4

A composite material is obtained by the above described method by admixing the initial components in the following amounts:

50 parts granular activated carbon, 0.5 part silver containing cation exchange resin with 250 mg/g silver content, 0.5 part iodine containing anion exchange resin with 250 mg/g iodine content, and 49 parts modified polyacrylonitrile based fibers.

The equivalent ratio of the amounts of silver and iodine in the mixture, using the corresponding atomic weights of the elements, is calculated as follows.

$$Ag:I=(250/107):(250/127)=2.34:1.97.$$

The exterior surface area of the iodine containing anion-exchange resin granules is calculated as follows:

$$S_j=(3\cdot 0.005)/(0.001\cdot 1500)=0.01 \text{ m}^2 \text{ per 1 kg of material.}$$

The exterior surface of modified polyacrylonitrile based fibers (amphoteric fibers) is calculated as follows:

$$S_f=(2\cdot 0.49)/(2\cdot 10^{-5}\cdot 1600)=3.06 \text{ m}^2 \text{ per 1 kg of material.}$$

This composite material is packed into a cylindrical column 30 mm in diameter and 60 mm high. Water containing 100 cells/l Coli-index (*E. Coli* content) and 200 cells/ml total microbe number (TMN) is passed through the column at the flow rate of 0.1 l/min and at a pressure of 0.005 atm. No *E. Coli* cells are found in the filtered water (Coli-index 0), TMN is 8 cells/ml.

EXAMPLE 5

The adsorption column is obtained analogously to Example 1. One liter of highly contaminated water with *E. Coli* index 200 and TMN 1000 is filtered through the column. The adsorption column is then kept for two days in a thermostat at 37° C. temperature. Sterile water is then passed through the column and the first 100 ml of water removed from the outlet is analyzed to be *E. Coli* index<3, and TMN 12.

The results shown above demonstrate that there is a bacteriostatic effect, namely, the multiplication of the microorganisms in the adsorption layer is suppressed. This effect is obtained during water filtration using the method claimed in the present invention.

EXAMPLE 6

Five liters of water are filtered through an adsorption column identical to the one used in Example 1. Total microbe number (TMN) of the water is initially 1000 cells/ml). The experiment is repeated the next day. The same experiment is repeated on a daily basis for as long as the filtered water is in compliance with water quality requirements (TMN<50). The total amount of contaminated water passed through the material is 140 liters (see FIG. 2, curve 1). Thus, the herein claimed method is demonstrated to ensure long time bactericidal action of the adsorption column.

EXAMPLE 7

A composite material was obtained by the above described method by mixing the initial components in the following amounts:

50 parts granulated activated carbon, 1 part polyacrylonitrile based silver containing modified fibers obtained by alkaline hydrolysis in the presence of cross-linking agents with a silver content of 107 mg/g, 0.5 part iodine containing anion-exchange resin with an iodine content of 200 mg/g, and 48.5 parts activated carbon fibers.

The equivalent ratio of the amounts of silver and iodine in the mixture, using the corresponding atomic weights of the elements, was calculated as follows:

$$Ag:J=(1\cdot 107/107):(0.5\cdot 200/127)=1:0.79.$$

The exterior surface area of the iodine containing anion-exchange resin granules was calculated as follows:

$$S_j=(3\cdot 0.005)/(0.001\cdot 1500)=0.01 \text{ m}^2 \text{ per 1 kg of material.}$$

The exterior surface area of the activated carbon fibers (amphoteric fibers) was calculated as follows:

$$S_f=(2\cdot 0.485)/(1\cdot 10^{-5}\cdot 1100)=8.8 \text{ m}^2 \text{ per 1 kg of material.}$$

This composite material was packed into a cylindrical column 30 mm in diameter and 60 mm high. Water containing 100 cells/l Coli-index (*E. Coli* content) and 200 cells/ml total microbe number (TMN) was passed through the column at a flow rate of 0.1 l/min and at a pressure of 0.005 atm. No *E. Coli* cells were found in the filtered water (Coli-index 0), TMN was 8 cells/ml.

Comparative Example A

A composite material is obtained according to the above described method by admixing adsorption materials in the following amounts: 39 parts granular activated carbon, 30 parts cation-exchange resin, 0.5 part silver containing cation-exchange resin, 29.5 parts anion-exchange resin, 0.5 part iodine containing anion-exchange resin, and 0.5 part activated carbon fibers.

The exterior surface area of the iodine containing anion-exchange resin granules is calculated as follows:

$$S_j=(3\cdot 0.005)/(0.001\cdot 1500)=0.01 \text{ m}^2 \text{ per 1 kg of material.}$$

The exterior surface area of the activated carbon fibers (amphoteric fibers) is calculated as follows:

$$S_f=(2\cdot 0.005)/(1\cdot 10^{-5}\cdot 1100)=0.09 \text{ m}^2 \text{ per 1 kg of material,}$$

In this case, $S_j>0.01S_f$. Therefore, the example falls outside of the limits of the present invention, because the exterior surface of iodine containing granules is more than one per cent of the fibrous component surface.

This composite material is packed into a cylindrical column 30 mm in diameter and 60 mm high. Water containing 100 cells/l Coli-index (*E. Coli* content) and 200 cells/ml total microbe number (TMN) is passed through the column at a flow rate of 0.1 l/min and at a pressure of 0.005 atm. The filtered water tests as *E. Coli* index =8 and TMN=25 and is not in compliance with drinking water microbiological requirements.

Comparative Example B

A composite material is obtained by the above described method by admixing the initial components in the following amounts:

50 parts granular activated carbon, 0.5 part silver containing cation-exchange resin with 250 mg/g silver content, 0.5 part iodine containing anion-exchange resin with 500 mg/g iodine content, and 49 parts activated carbon fibers.

The equivalent ratio of the amounts of silver and iodine in the composite material, accounting for the atomic weights of the elements, was: Ag:I=(250/107): (500/127)=2.34:2.94. Therefore, an excess of iodine as compared to silver is in the composite material.

The exterior surface of the iodine containing anion exchange granules is calculated as:

$$S_f=(3 \cdot 0.005)/(0.001 \cdot 1500)=0.01 \text{ m}^2 \text{ per 1 kg of material.}$$

The exterior surface of the activated carbon fibers (amphoteric fibers) is calculated as:

$$S_f=(2 \cdot 0.49)/(1 \cdot 10^{-5} \cdot 1100)=8.9 \text{ m}^2 \text{ per 1 kg of material.}$$

The composite adsorption material is packed into a cylindrical column 30 mm in diameter and 60 mm high. Water is passed through the column at a flow rate of 0.1 l/min at 0.005 atm. pressure head. The iodine content in the first portions of filtered water is 1 mg/g, which exceeds the permissible concentration value.

In addition to the efficient purification of *E. Coli*, the invention method solves simultaneously another problem. There is high degree of purification of the drinking water from heavy metals and organic matter, irrespective of water contamination, which is confirmed by the Examples 10, 11 and 12 below.

EXAMPLE 8

An adsorption column identical to the column in Example 1 is tested as a drinking water filter according to the standard NSF 53. A test solution is prepared using St. Petersburg tap water and adding the following impurities at the corresponding concentrations: copper-3 mg/l, o-dichlorobenzol-1.2 mg/l, chloroform-0.4 mg/l, *E. Coli* cells-50 cell/l. The test solution is filtered through the device. Concentration of impurities in the filtered water is measured after filtering 10 liters and 100 liters of model solution (see Table).

EXAMPLE 9

An adsorption column as in Example 1 is tested as a drinking water filter according to the standard NSF 53. A test solution is prepared using distilled water with the following impurities added: copper-3 mg/l, o-dichlorobenzol-1.2 mg/l, chloroform-0.4 mg/l, *E. Coli* cells-50 cells/l. Concentration of impurities in the filtered water is measured after filtering 10 liters and 100 liters of model solution (see Table).

EXAMPLE 10

An adsorption column as in Example 6 is tested by methods analogous to Example 9. The results are given in the Table, which presents parameters of the incoming water and filtered water of Examples 8–10.

TABLE

| Water Parameters | Untreated Water | Water After Treatment ||||||
|---|---|---|---|---|---|---|---|
| | | Example 8 || Example 9 || Example 10 ||
| | | 10 liters | 100 liters | 10 liters | 100 liters | 10 liters | 100 liters |
| Copper content, mg/l | 3.0 | 0.05 | 0.10 | 0.05 | 0.08 | 0.07 | 0.5 |
| Dichlorobenzol content, mg/l | 1.2 | 0.01 | 0.02 | 0.01 | 0.02 | 0.06 | 0.1 |
| Chloroform content, mg/l | 0.4 | 0.005 | 0.01 | 0.004 | 0.01 | 0.01 | 0.1 |
| Coli index, cells/l | 50 | 0 | 0 | 0 | 0 | 3 | 5 |

While this invention has been described with reference to particular embodiments, and illustrated by means of specific examples, it will be apparent to those skilled in the art that variations and modifications can be made without departing from the principles and scope of the invention as expressed in the appended claims.

We claim:

1. A method of disinfecting water comprising passing impure water through a composite material which comprises a substantially uniformly distributed admixture comprising iodine containing anion-exchange resin granules, activated carbon granules, silver containing adsorbent and amphoteric fibers, wherein the combined exterior surface of said iodine containing anion-exchange resin granules is less than one percent of the combined exterior surface of said amphoteric fibers, wherein the amphoteric fibers are selected from the group consisting of activated carbon fibers, ionexchange polymer fibers and mixtures thereof, and wherein the combined equivalent content of silver exceeds the combined equivalent content of iodine, and removing disinfected and purified water from said composite material.

2. The method of claim 1, wherein the disinfected and purified water removed from said composite material is substantially free of *E. Coli*, iodine, and silver.

3. The method of claim 1, wherein the equivalent content of silver is more than about 115 percent of the equivalent content of iodine.

4. The method of claim 1, wherein the combined external surface area of the amphoteric fibers exceeds the external surface area of the iodine containing anion-exchange resin by at least 100 times.

5. The method of claim 1, wherein the composite material through which the water is filtered comprises from about 0.1 to 1% iodine containing anion-exchange resin, from about 5 to 90% activated carbon granules, from about 0.1 to 1% silver containing adsorbent and from about 1 to 50% amphoteric fibers.

6. The method of claim 5, wherein the activated carbon granules are present in an amount from about 5 to 50%, the amphoteric fibers are present in an amount from about 1 to 20% and wherein said composite material further contains a granular material selected from the group consisting of cation exchange resin, anion exchange resin, and mixtures thereof.

7. The method of claim 6, wherein said granular material comprises about 5 to 50% cation exchange resin, and about 5 to 50% anion exchange resin.

8. The method of claim 5, wherein the activated carbon granules are present in an amount from about 50 to 90%, the combined external surface area of the amphoteric fibers exceeds the external surface area of the iodine containing anion-exchange resin by at least 500 times, and the equivalent content of silver is more than about 15 percent higher than the equivalent content of iodine.

9. The method of claim 1, wherein the amphoteric fibers are ion-exchange polymer fibers having an ion-exchange capacity of basic groups of at least 1 meq/g, and of acidic groups of at least 2 meq/g.

10. The method of claim 9, wherein the amphoteric fibers have lengths between about 1 and 10 mm and diameters of about 1 to 50 microns.

11. The method of claim 1, wherein the amphoteric fibers comprise activated carbon fibers having lengths of 0.2 to 10 mm, and diameters of 1 to 20 microns.

12. The method of claim 11, wherein the activated carbon fibers are 5 to 10 microns in diameter.

13. The method of claim 1, wherein the silver containing adsorbent is selected from the group consisting of silver containing cation exchange resin granules, silver containing modified polyacrylonitrile based fibers obtained by the alkaline hydrolysis of polyacrylonitrile in the presence of cross-linking agents, and mixtures thereof.

14. The method of claim 1, wherein the silver containing adsorbent has ion-exchange capacity for basic groups of at least 1 meq/g (milliequivalents per gram), and ion-exchange capacity for acidic groups of at least 2 meq/g.

15. (Amended) A method of disinfecting water comprising: passing impure water through a composite material which comprises a substantially uniformly distributed admixture comprising from about 0.1 to 1% iodine containing anion-exchange resin granules, from about 50 to 90% activated carbon granules, from about 0.1 to 1% of silver containing adsorbent selected from the group consisting of silver containing cation exchange resin and silver containing modified polyacrylonitrile based fibers obtained by alkaline hydrolysis of polyacrylonitrile in the presence of cross-linking agents, and from about 1 to 50% amphoteric fibers selected from the group consisting of activated carbon fibers, ion-exchange polymer fibers and mixtures thereof; wherein the combined exterior surface of said iodine containing anion-exchange resin granules is less than one percent of the combined exterior surface of maid amphoteric fibers; and wherein the combined equivalent content to silver exceeds the combined equivalent content of iodine; and removing disinfected and purified water which is substantially free of *E. Coli*, iodine, and silver from said composite material.

16. The method of claim 15, wherein said silver containing adsorbent comprises modified polyacrylonitrile based fibers that are 1 to 10 mm long and 1 to 50 microns in diameter.

17. The method of claim 15, wherein the equivalent content of silver exceeds the equivalent content of iodine by at least 15 percent, and wherein the combined external surface area of the amphoteric fibers exceeds the external surface area of the iodine containing anion-exchange resin by factor of at least 500.

18. A method of disinfecting water comprising: passing impure water through a composite material which comprises a substantially uniformly distributed admixture comprising about 0.1 to 1% iodine containing anion-exchange resin granules, about 5 to 50% activated carbon granules, about 0.1 to 1% silver containing adsorbent selected from the group consisting of silver containing cation exchange resin granules and silver containing modified polyacrylonitrile based fibers obtained by alkaline hydrolysis of polyacrylonitrile in the presence of cross-linking agents, about 5 to 50% cation exchange resin, about 5 to 50% anion exchange resin, and about 1 to 50% amphoteric fibers selected from the group consisting of activated carbon fibers, ion-exchange polymer fibers and mixtures thereof; wherein the combined exterior surface of said iodine containing anion-exchange resin granules is less than one percent of the combined exterior surface of said amphoteric fibers, and wherein the combined equivalent content of silver exceeds the combined equivalent content of iodine; and removing from said composite material disinfected and purified water which is substantially free of *E. Coli*, iodine, and silver.

* * * * *